Figure 1:
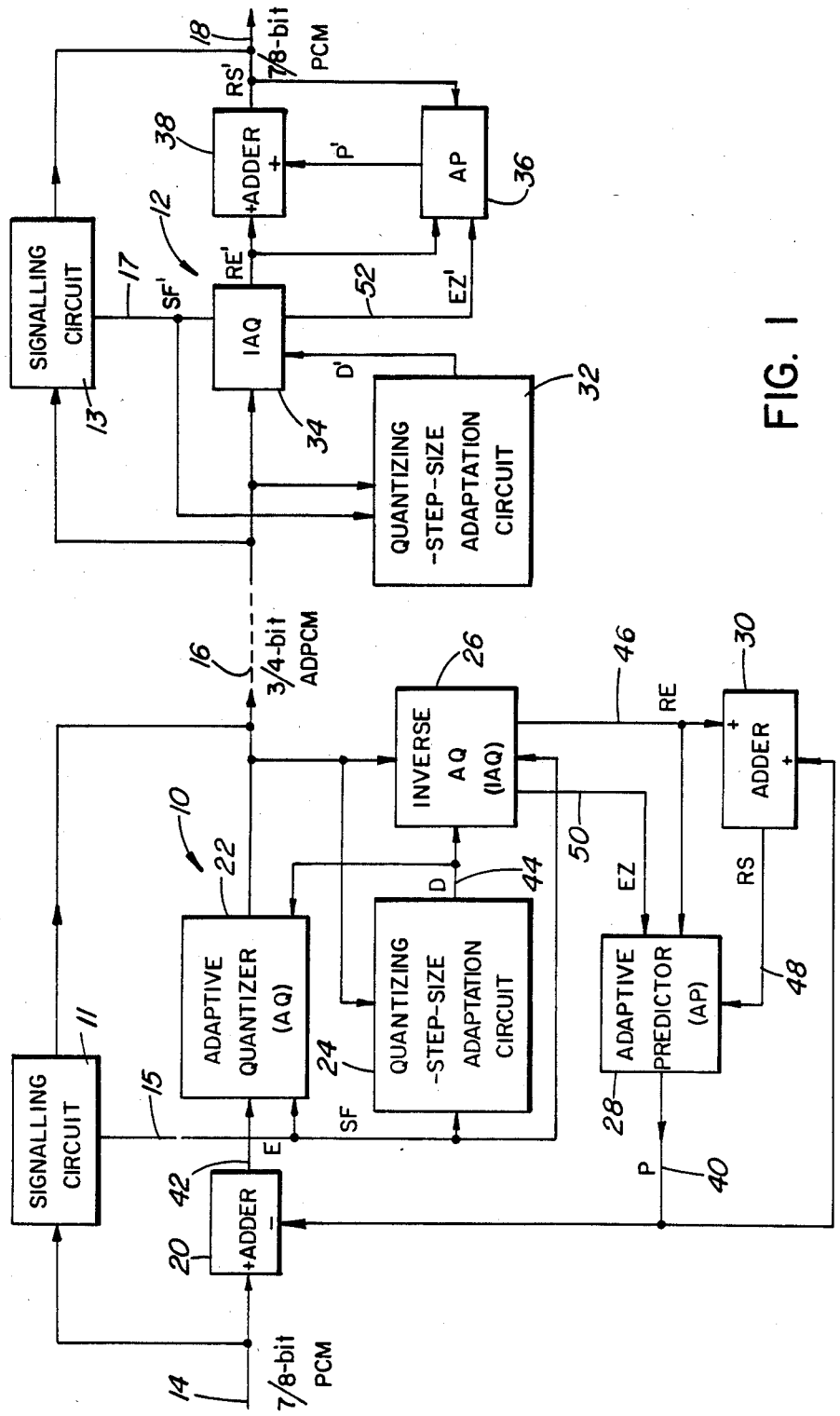

United States Patent [19]

Weirich et al.

[11] Patent Number: 4,549,304
[45] Date of Patent: Oct. 22, 1985

[54] ADPCM ENCODER/DECODER WITH SIGNALLING BIT INSERTION

[75] Inventors: Andreas H. Weirich; Leo Strawczynski, both of Ottawa, Canada

[73] Assignee: Northern Telecom Limited, Montreal, Canada

[21] Appl. No.: 555,359

[22] Filed: Nov. 28, 1983

[51] Int. Cl.[4] .......................................... H03K 13/22
[52] U.S. Cl. .............................. 375/27; 340/347 DD; 332/11 D; 370/7
[58] Field of Search ...................... 375/27, 28, 29, 30; 370/7, 82, 83; 340/347 DD; 358/135, 136; 332/11 D

[56] References Cited

U.S. PATENT DOCUMENTS 3,609,552  9/1971  Limb ....................................... 375/27
4,202,011  5/1980  Koga ..................................... 358/136
4,237,552 12/1980  Aikoh et al. ............................. 370/7
4,475,213 10/1984  Medaugh ............................... 375/27
4,486,876 12/1984  Gaunt, Jr. et al. ..................... 375/30

Primary Examiner—Robert L. Griffin
Assistant Examiner—Stephen Chin
Attorney, Agent, or Firm—R. John Haley

[57] ABSTRACT

In an ADPCM transmission system, signalling frames of an incoming multiplexed PCM signal are identified and signalling bits extracted therefrom. During each signalling frame, an ADPCM encoder/decoder is controlled by the signalling frame signal to operate entirely for 3-bit ADPCM, instead of the regular 4-bit ADPCM, to which 3-bit ADPCM the extracted signalling bits are added for transmission. The deliberate alteration from 4-bit to 3-bit ADPCM at the encoder and decoder of the system in each signalling frame ensures proper adaptation and consequently no loss of tracking between the encoder and the decoder.

5 Claims, 3 Drawing Figures

4,549,304

ADPCM ENCODER/DECODER WITH SIGNALLING BIT INSERTION

This invention relates to ADPCM (adaptive differential pulse code modulation) encoders and decoders.

CROSS REFERENCES TO RELATED APPLICATIONS

Reference is directed to a related U.S. patent application Ser. No. 555,357 filed simultaneously herewith by P. Chow, A. Weirich, and L. Strawczynski entitled "ADPCM encoder/decoder with improved tracking", and a related U.S. patent application Ser. No. 555,358 filed simultaneously herewith by A. Weirich and L. Strawczynski entitled "ADPCM encoder/decoder with zero code suppression". The disclosure of each of these copending applications is hereby incorporated herein by reference.

In order to reduce the bandwidth required for digital transmission of voice frequency signals, it is known to convert an 8-bit PCM voice frequency signal to a 4-bit ADPCM signal. Two such ADPCM signals can be transmitted in the same bandwidth as one PCM signal. Furthermore, in many circumstances such ADPCM signals can be transmitted in place of PCM signals over existing transmission links using existing equipment, which is merely supplemented by ADPCM encoders and decoders for converting between PCM and ADPCM signals at the ends of the transmission links.

For conversion from PCM to ADPCM signals without undue signal degradation, it is known to use an encoder which comprises an adaptive predictor and an adaptive quantizer. The quantizer produces the ADPCM signal from the difference between the incoming PCM signal and a predicted signal produced by the adaptive predictor. Adaptation of the quantizer is controlled by the ADPCM signal, which is also supplied to an inverse adaptive quantizer to produce a reconstructed difference signal which controls the adaptive predictor. Similarly, the decoder comprises an inverse adaptive quantizer to produce a reconstructed difference signal from the ADPCM signal, and an adaptive predictor responsive to the reconstructed difference signal for producing a predicted signal, the latter two signals being combined to produce the decoded PCM signal. Ideally, predictor coefficients of the adaptive predictors in the encoder and decoder are identical at all times. Any departure from this is referred to as mistracking.

A problem arises in that some standard digital multiplex transmission systems (e.g. T1 carrier) use a bit stealing technique for transmission of signalling information, one bit of every code word in certain multiplex frames (the signalling frames) being designated a signalling bit. With PCM coding, the encoder characteristic is unchanged for signalling frames, and the decoder characteristic is altered to minimize decoding errors. The reduction from 8 to 7 bits for each PCM code word in each signalling frame results in an acceptably small signal degradation. Applying the same techniques to ADPCM coding, however, would result in severe signal degradation due to the reduction from 4 to 3 bits for each code word in each signalling frame, and due to the different predictor functions at the encoder and decoder which would result.

An object of this invention is to provide an improved ADPCM transmission system by means of which the above problem is avoided or reduced.

According to this invention there is provided an ADPCM transmission system in which ADPCM signal channels are multiplexed in t.d.m. frames each providing n bits for transmission of each channel, the frames comprising, in addition to regular frames, signalling frames in which m of the n bits of each channel are provided for the transmission of additional information, where n and m are integers and $n>m>0$, the system comprising: means for providing an indication of each signalling frame; ADPCM signal encoding means responsive to said indication for producing n-bit ADPCM signals in the regular frames and (n-m)-bit ADPCM signals in the signalling frames; and ADPCM signal decoding means responsive to said indication for decoding n-bit ADPCM signals in the regular frames and (n-m)-bit ADPCM signals in the signalling frames.

Thus in accordance with the invention each channel is transmitted in the form of an n-bit ADPCM code in each regular frame and an (n-m)-bit ADPCM code in each signalling frame, in which the other m bits for each channel may be used for signalling or other information. The ADPCM signal encoding and decoding means are each responsive to the signalling frame indication to operate properly for n- or (n-m)-bit ADPCM coding, whereby the quantizing and predicting functions operate properly in all frames without giving rise to mistracking.

Preferably the ADPCM signal decoding means comprises: means for producing, in dependence upon said indication, an adaptive quantizing-step-size signal from the ADPCM signal; an inverse adaptive quantizer for producing, in dependence upon said indication, a reconstructed error signal from the ADPCM signal and the adaptive quantizing-step-size signal; means for producing a reconstructed signal from the reconstructed error signal and a predicted signal; and an adaptive predictor for producing the predicted signal from the reconstructed signal and the reconstructed error signal; said signals being produced for each of the ADPCM signal channels.

Preferably also the ADPCM signal encoding means comprises: a decoder constituted by the ADPCM signal decoding means; means for producing, for each channel, an error signal from a signal to be encoded and the predicted signal of the channel; and an adaptive quantizer for producing, for each channel and in dependence upon said indication, the ADPCM signal from the error signal and the adaptive quantizing-step-size signal of the channel.

Conveniently the means for producing the reconstructed error signal and the means for producing the error signal comprise a single adding means which is multiplexed for producing said signals at different times.

For convenient handling of conventional 8-bit PCM signals in the standard T1 carrier format, preferably $n=4$ and $m=1$.

Figure 2:
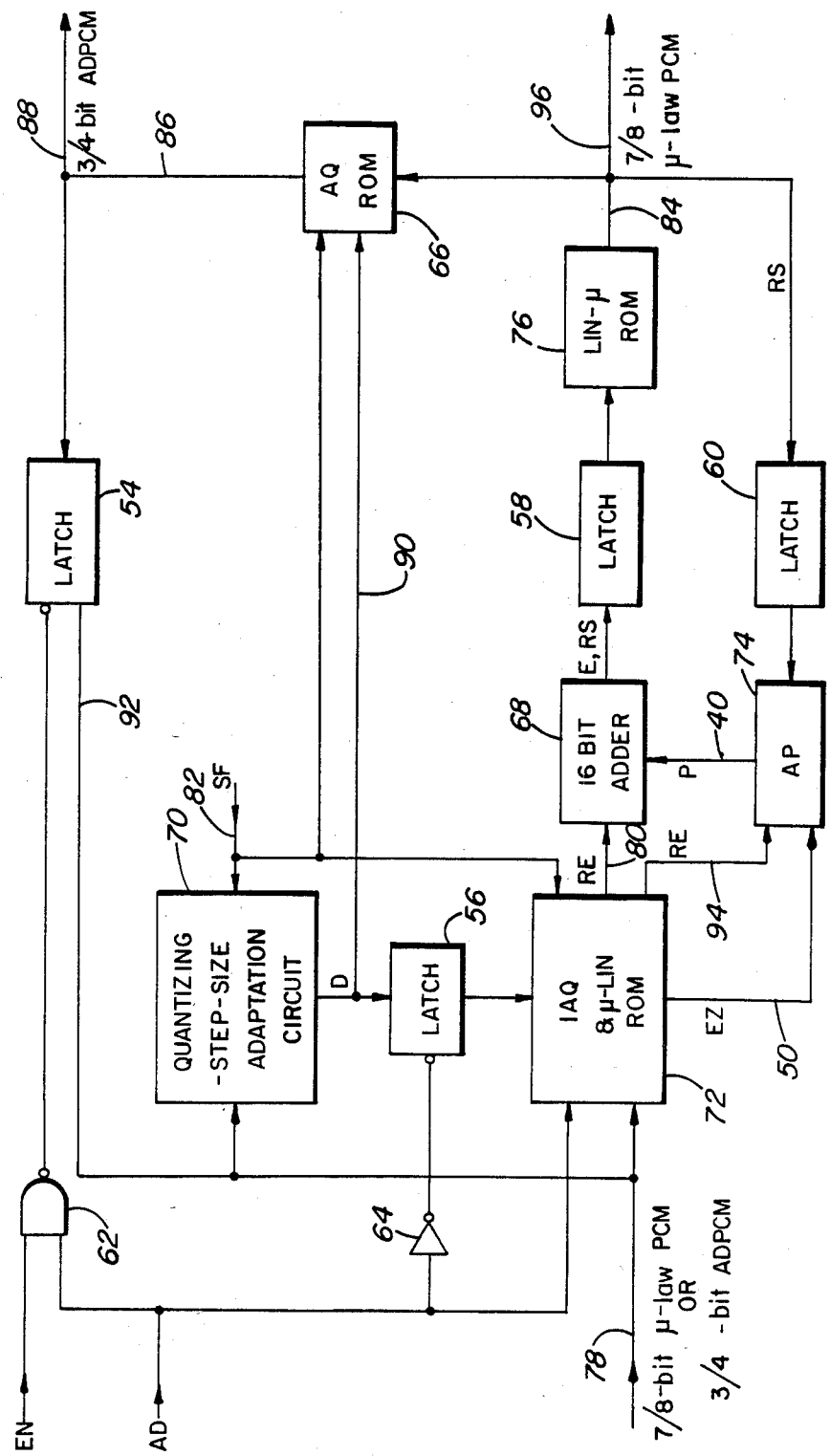
Figure 3:
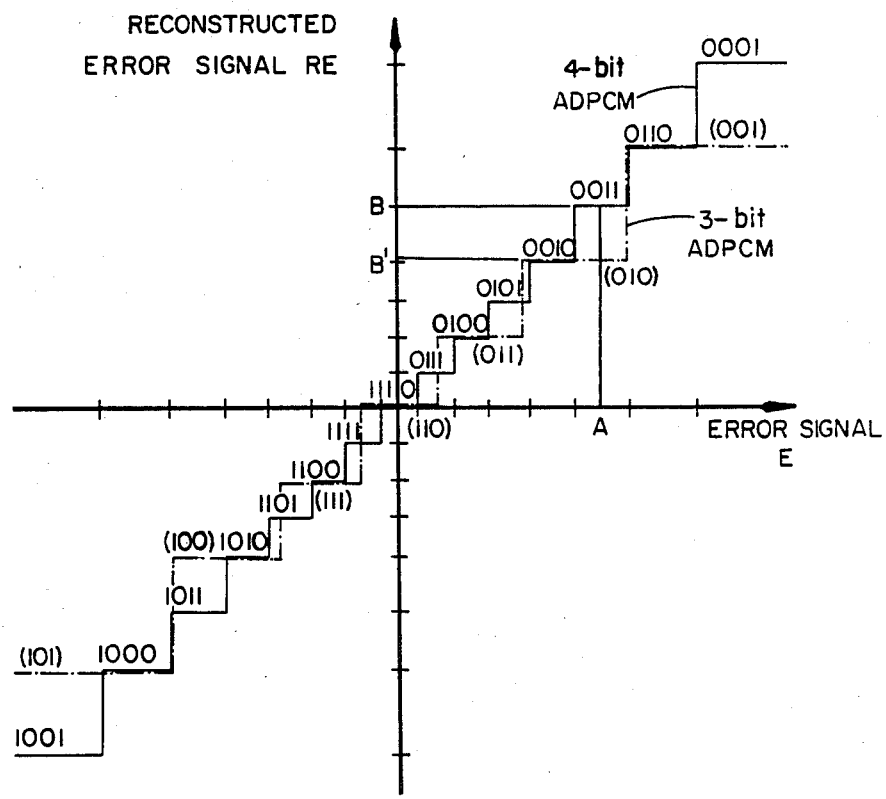

The invention will be further understood from the following description with reference to the accompanying drawings, in which:

FIG. 1 is a functional block diagram of an ADPCM transmission system in accordance with the invention;

FIG. 2 schematically illustrates an encoder and decoder of the system of FIG. 1 in the form of a block diagram; and FIG. 3 illustrates ADPCM encoding and decoding characteristics of the encoder and decoder.

Referring to FIG. 1, there is illustrated a functional block diagram of an ADPCM transmission system which includes an ADPCM encoder 10, an ADPCM decoder 12, and signalling circuits 11 and 13. The encoder 10 converts 7- or 8-bit PCM signals incoming on a bus 14 to 3- or 4-bit ADPCM signals outgoing on a transmission link 16. The decoder 12 is responsive to the latter signals to reproduce 7- or 8-bit PCM signal on a bus 18.

The buses 14 and 18 can be coupled to standard T1 carrier transmission links, on which as is known 24 PCM channels are time division multiplexed in frames. The frames comprise regular frames, in each of which each channel comprises an 8-bit PCM word, and signalling frames, in each of which each channel comprises a 7-bit PCM word and a signalling bit. Each frame also includes a framing bit which enables the regular frames and signalling frames to be distinguished from one another. Similarly, the transmission link 16 can be constituted by a T1 carrier transmission link, which can carry 48 channels and signalling bits using the present invention.

The signalling circuit 11 is supplied with the incoming 7/8-bit PCM signals from the bus 14 and, in known manner, identifies the signalling frames and derives the signalling bits therefrom. The circuit 11 supplies the signalling bits to the transmission link 16 in the signalling frames with the 3-bit ADPCM codes of the respective channels produced as described below. During each signalling frame, the circuit 11 produces a signal SF=1 on a line 15, as also discussed below.

Similarly, the signalling circuit 13 identifies the signalling frames with a signal SF'=1 on a line 17, derives the signalling bits from the incoming signals from the transmission link 16, and supplies them in the signalling frames to the bus 18 for transmission with the respective PCM channel signals.

The functional blocks of the encoder 10 comprise an adder 20, an adaptive quantizer (AQ) 22, a quantizing-step-size adaptation circuit 24, an inverse adaptive quantizer (IAQ) 26, an adaptive predictor (AP) 28, and an adder 30. The functional blocks of the decoder 12 comprise elements 32, 34, 36, and 38 which correspond to, and are interconnected in the same manner as, the elements 24, 26, 28, and 30 respectively of the encoder 10.

In operation of the encoder 10, a PCM signal sample incoming on the bus 14 has subtracted from it (after linearization as described below with reference to FIG. 2) by the adder 20 an adaptively predicted signal P, produced by the AP 28, on the bus 40, to produce an error signal E on a bus 42. The signal E is quantized by the AQ 22, in dependence upon a quantizing-step-size signal D provided on a bus 44 by the adaptation circuit 24, to produce an ADPCM signal sample on the transmission link 16.

The ADPCM signal is also supplied to the circuit 24 to control the quantizing-step-size adaptation, and to the IAQ 26 which in dependence upon the step size signal D produces a reconstructed error signal RE on a bus 46. The signal RE is added to the predicted signal P on the bus 40 by the adder 30 to produce a reconstructed PCM signal sample RS on a bus 48. The AP 28 is responsive to the signals RE and RS to update the predicted signal P.

As is known, the AP 28 produces predictor coefficients which are adapted in dependence upon a leakage function and in dependence upon the reconstructed signal RS and the reconstructed error signal RE. For example, each predictor coefficient is adapted by making its value at any sampling time equal to its value at the preceding sampling time multiplied by a constant less than one (the leakage function), modified by a function of the signal samples RE and RS. If the latter function has a zero value, then it can be seen that, because the leakage function constant is less than one, the predictor coefficient will gradually be reduced to zero.

In a similar manner in the decoder 12 the ADPCM signal is supplied to the circuit 32 to control the decoder quantizing-step-size signal D', which is used by the IAQ 34 to produce from the ADPCM signal a reconstructed error signal RE'. This is added by the adder 38 to a predicted signal P' produced by the AP 36 to produce a reconstructed PCM signal sample RS' which constitutes the output of the decoder, and which is used with the signal RE' to update the predicted signal P'.

As illustrated in FIG. 1, in the encoder 10 the IAQ 26 also supplies to the AP 28 a signal EZ via a line 50, and in the decoder 12 the IAQ 34 similarly supplies to the AP 36 a signal EZ' via a line 52. The respective IAQ 26 or 34 produces the signal EZ or EZ' with a predetermined value (e.g. logic 1) in response to the ADPCM signal code corresponding to a zero value. In response to this value of the signal EZ or EZ', the respective AP 28 or 36 does not update its predictor coefficients in dependence upon the signals RE and RS or RE and RS' respectively, but only in dependence upon the leakage function.

The signals EZ and EZ' are provided in order to permit compensation for the mid-tread ADPCM characteristic which is illustrated in FIG. 3, and are mentioned here only for the sake of completeness and consistency. Our copending patent application entitled "ADPCM encoder/decoder with zero code suppression", already referred to, is directed to this feature and describes it in greater detail. Reference is directed to this copending application for further information in this respect.

As also illustrated in FIG. 1, the signal SF on the line 15 is supplied to the AQ 22, the circuit 24, and the IAQ 26 in the encoder 10, and the corresponding signal SF' on the line 17 is supplied to the circuit 32 and the IAQ 34 in the decoder 12. During each regular frame, the signals SF and SF' are logic 0, in response to which the encoder 10 and decoder 12 operate to convert between 8-bit PCM and 4-bit ADPCM codes. During each signalling frame, in response to the signal SF=1 the AQ 22 quantizes the error signal E as a 3-bit ADPCM signal, leaving one bit free to be used as a signalling bit. Also in response to the signals SF=1 and SF'=1, the characteristics of the IAQs 26 in the encoder 10 and 34 in the decoder 12 are modified for inverse adaptive quantization of the 3-bit ADPCM signals in the signalling frame. Similarly, the characteristics of the quantizing-step-size adaptation circuits 24 and 32 are modified for 3-bit ADPCM code words. In view of these changes, the quantizing process at the decoder continues to track that at the encoder, so that signal degradation due to the provision of the signalling bits is reduced to an acceptably low level.

FIG. 2 illustrates a block diagram of an encoder and decoder corresponding to the function diagram of FIG. 1. In FIG. 2, latches 54, 56, 58, and 60 are used to enable multiplexing of signals as described below. FIG. 2 also shows a NAND gate 62, an inverter 64, an AQ ROM (read-only memory) 66 which corresponds to the AQ 22 in FIG. 1, a 16-bit adder 68 which corresponds to the adders 20, 30, and 38 in FIG. 1, a quantizing-step-size adaptation circuit 70 which corresponds to the circuits 24 and 32 in FIG. 1, an IAQ and mu-law to linear PCM conversion ROM 72 which replaces the IAQs 26 and 34 in FIG. 1, an AP 74 which corresponds to the APs 28 and 36 in FIG. 1, and a linear to mu-law PCM conversion ROM 74. The signal SF, which corresponds to both signals SF and SF' in FIG. 1 because the encoder and decoder are synchronized, is supplied via a line 82 to the AQ 66, the IAQ ROM 72, and the circuit 70. In addition, signals EN and AD are supplied to the gate 62 whose output enables the latch 54, the signal AD also being supplied to the ROM 72 and being inverted by the inverter 64 to enable the latch 56.

In operation, the arrangement of FIG. 2 is controlled by the signals E and AD to operate alternately as a mu-law PCM to ADPCM encoder and decoder. This operation is initially described assuming that the signal SF=0, i.e. for regular frames.

For operation as an encoder, in an initial part of the encoding cycle the signal AD is a logic 0 so that the latch 54 is inhibited via the gate 62, the latch 56 is inhibited via the inverter 64, and the ROM 72 is controlled to convert an 8-bit mu-law PCM code word incoming on a bus 78 into a negative (two's complement) 15-bit linear PCM code word on a bus 80. The negative linear PCM code word on the bus 80 is added by the adder 68 to the relevant predicted signal P produced by the AP 74 on the bus 40, to produce a negative error signal E which is latched in the latch 58.

In a second part of the encoding cycle, the signals E and AD are each a logic 1, so that the latches 54 and 56 are enabled. The negative linear error signal E from the latch 58 is converted by the ROM 76 into an 8-bit mu-law PCM negative error signal code word on a bus 84, which is quantized by the AQ ROM 66 into a 4-bit ADPCM code word on a bus 86, the quantization being dependent on the quantizing-step-size signal D which is supplied on a bus 90 to the AQ ROM 66 and is also latched in the latch 56. The ADPCM code word on the bus 86 constitutes the output of the encoder on a bus 88 corresponding to the transmission link 16 in FIG. 1, and is also latched in the latch 54.

The output of the latch 54 is supplied via a bus 92 to the circuit 70, which adapts the quantizing-step-size signal D accordingly, and to the ROM 72. The signal AD=1 causes the ROM 72 to operate as an inverse adaptive quantizer and mu-law to linear converter, responsive to the quantizing-step-size signal latched in the latch 56 to produce a linear reconstructed error signal RE on the bus 80. The signal RE is added to the linear predicted signal P on the bus 40 by the adder 68 to produce a linear reconstructed signal RS which is latched in the latch 58. The signal RS is converted by the ROM 76 into a mu-law signal which is latched from the bus 84 into the latch 60.

The reconstructed signal RS from the latch 60, and a mu-law version of the reconstructed error signal RE supplied by the IAQ ROM 72 on a bus 94, are applied to the AP 74. The AP 74 adapts its predictor coefficients in dependence upon the leakage function and these signals if the signal EZ, supplied from the ROM 72 to the AP 74 via the line 50, does not have the predetermined value, e.g. logic 1. If the signal EZ has the predetermined value such adaptation of the predictor coefficients by the AP 74 in dependence upon the signals RE and RS is inhibited, and the predictor coefficients are changed only by the leakage function included in the characteristics of the AP 74.

For operation as a decoder, the signals EN and AD are a logic 0 and 1 respectively, so that the latch 54 is inhibited and the latch 56 is enabled. A 4-bit ADPCM signal to be decoded is in this case supplied to the ROM 72 via the bus 78, and the consequent reconstructed signal is derived from the ROM 76 via the bus 84 and a bus 96 corresponding to the bus 18 in FIG. 1. Otherwise, the operation of the arrangement is the same as that described above for the second part of the encoding cycle.

In each signalling frame, the signal SF=1. In response to this signal, the ROMs 66 and 72 and the circuit 70 are controlled to operate for conversion between a 7-bit PCM signal and a 3-bit ADPCM signal, the remaining bit in each case constituting the signalling bit. Thus for example the ROM 72 is set to convert the 7-bit mu-law PCM signal into a linear signal, and the AQ ROM 66 produces a 3-bit ADPCM word on the bus 86, with proper adaptation characteristics. The deliberate control of the ROMs 66 and 72 and the circuit 70 by the signal SF to operate for 7-bit PCM and 3-bit ADPCM instead of 8-bit PCM and 4-bit ADPCM, as opposed to a mere disregard of the least significant bit of 4-bit ADPCM codes in the signalling frames, ensures that the adaptation in the decoder properly tracks that in the encoder, whereby signal degradation due to the provision of the signalling bits is not excessive.

FIG. 3 illustrates characteristics of the AQ ROM 66 and the IAQ ROM 72, for a given quantizing-step-size signal D. More particularly, FIG. 3 illustrates the 3-bit (in parentheses) and 4-bit ADPCM codes which are produced on the bus 86 by the AQ ROM 66 in response to the error signal E on the bus 84, in the signalling and regular frames respectively, and the consequent reconstructed error signal RE which is produced by the ROM 72 on the bus 80 from such ADPCM codes on the bus 78 or 92. For example, an error signal E of magnitude A shown in FIG. 3 will be quantized as the 3-bit ADPCM code 010 in the signalling frames, or as the 4-bit ADPCM code 0011 in the regular frames, which code is converted by the ROM 72 to a reconstructed error signal RE of magnitude B' or B respectively.

The particular ADPCM codes illustrated in FIG. 3 are given by way of example as possible codes for achieving a large number of logic 1s in the ADPCM signal, thereby simplifying clock recovery. Other codes may be used.

Although the invention has been described above in relation to the insertion of signalling bits into ADPCM codes for transmission, the invention is not limited thereto. More particularly, the invention is applicable to the transmission of any information with ADPCM codes. In general, n-bit ADPCM codes may be replaced by (n-m)-bit ADPCM codes together with m bits of other information, where n and m are integers and n>m>0.

Furthermore, although as described above the signalling frames of the PCM signal channels are synchronized with, or aligned in time with, the signalling frames of the ADPCM signal channels by the use of a single signal SF to denote all signalling frames, this need not be the case. The invention is equally applicable to a system in which the PCM signalling frames and the ADPCM signalling frames occur at different times, although this is not preferred. In addition, although reference has been made to mu-law PCM signals being converted into ADPCM signals, the invention is equally applicable to other signals, including A-law and linear PCM signals.

It should be understood that numerous other modifications, variations, and adaptations may be made to the particular embodiment described above without departing from the scope of the invention, which is defined by the claims. In particular, it is observed that the improved tracking and zero code suppression techniques, described in detail in the copending patent applications filed simultaneously herewith and already referred to, can be incorporated herein.

What is claimed is:

1. An ADPCM transmission system in which ADPCM signal channels are multiplexed in t.d.m. frames each providing n bits for transmission of each channel, the frames comprising, in addition to regular frames, signalling frames in which m of the n bits of each channel are provided for the transmission f additional information, where n and m are integers and $n>m>0$, the system comprising:

means for providing an indication of each signalling frame;

ADPCM signal encoding means responsive to said indication for producing n-bit ADPCM signals in the regular frames and (n-m)-bit ADPCM signals in the signalling frames; and ADPCM signal decoding means responsive to said indication for decoding n-bit ADPCM signals in the regular frames and (n-m)-bit ADPCM signals in the signalling frames.

2. A system as claimed in claim 1 wherein the ADPCM signal decoding means comprises:

means for producing, in dependence upon said indication, an adaptive quantizing-step-size signal from the ADPCM signal;

an inverse adaptive quantizer for producing, in dependence upon said indication, a reconstructed error signal from the ADPCM signal and the adaptive quantizing-step-size signal;

means for producing a reconstructed signal from the reconstructed error signal and a predicted signal; and an adaptive predictor for producing the predicted signal from the reconstructed signal and the reconstructed error signal; said signals being produced for each of the ADPCM signal channels.

3. A system as claimed in claim 2 wherein the ADPCM signal encoding means comprises:

a decoder constituted by the ADPCM signal decoding means;

means for producing, for each channel, an error signal from a signal to be encoded and the predicted signal of the channel; and an adaptive quantizer for producing, for each channel and in dependence upon said indication, the ADPCM signal from the error signal and the adaptive quantizing-step-size signal of the channel.

4. A system as claimed in claim 3 wherein the means for producing the reconstructed error signal and the means for producing the error signal comprise a single multiplexed adding means.

5. A system as claimed in claim 1 wherein $n=4$ and $m=1$.

* * * * *

UNITED STATES PATENT AND TRADEMARK OFFICE
CERTIFICATE OF CORRECTION

PATENT NO. : 4,549,304

DATED : October 22, 1985

INVENTOR(S) : Andreas H. Weirich et al.

It is certified that error appears in the above-identified patent and that said Letters Patent is hereby corrected as shown below:

On the title page, insert the name of the third inventor

-- Ernst August Munter, Kanata, Canada --.

Signed and Sealed this

Seventh Day of January 1986

[SEAL]

*Attest:*

DONALD J. QUIGG

*Attesting Officer*  *Commissioner of Patents and Trademarks*